United States Patent
Alley et al.

(10) Patent No.: US 9,158,728 B2
(45) Date of Patent: Oct. 13, 2015

(54) SYSTEMS AND METHODS FOR IMPROVED LINKING OF MASTER AND SLAVE DEVICES

(75) Inventors: Daniel Milton Alley, Earlysville, VA (US); Stephen Emerson Douthit, Charlottesville, VA (US)

(73) Assignee: General Electric Company, Schenectady, NY (US)

( * ) Notice: Subject to any disclaimer, the term of this patent is extended or adjusted under 35 U.S.C. 154(b) by 479 days.

(21) Appl. No.: 13/615,360

(22) Filed: Sep. 13, 2012

(65) Prior Publication Data
US 2014/0075072 A1 Mar. 13, 2014

(51) Int. Cl.
*G06F 13/42* (2006.01)
*G06F 15/17* (2006.01)

(52) U.S. Cl.
CPC ............ *G06F 13/4291* (2013.01); *G06F 15/17* (2013.01)

(58) Field of Classification Search
CPC .. G06F 13/4291; G06F 13/4282; G06F 15/17
See application file for complete search history.

(56) References Cited

U.S. PATENT DOCUMENTS

| | | | |
|---|---|---|---|
| 8,135,881 B1 | 3/2012 | Obkircher | |
| 8,433,543 B2 * | 4/2013 | LeBrun | 702/189 |
| 8,873,241 B2 * | 10/2014 | Muldowney et al. | 361/752 |
| 8,908,779 B2 * | 12/2014 | Douglass | 375/257 |
| 8,943,250 B2 * | 1/2015 | Alley | 710/110 |
| 2009/0137318 A1 | 5/2009 | Russo et al. | |
| 2013/0332633 A1 * | 12/2013 | CARNEY et al. | 710/48 |
| 2014/0208070 A1 * | 7/2014 | Alley et al. | 712/31 |

FOREIGN PATENT DOCUMENTS

WO 9621974 A1 7/1996

OTHER PUBLICATIONS

Texas Instruments—"Extending the SPI bus for long-distance communication"; 7 pages, dated 2011.*
Search Report from PCT/US2013/056729 dated Dec. 4, 2013.
Soja R: "The Versatile SPI—Part 2", Electronic Engineering, Morgan-Grampian Ltd. London, GB, vol. 61, No. 755, Nov. 1, 1989.

* cited by examiner

*Primary Examiner* — Brian Misiura
(74) *Attorney, Agent, or Firm* — Fletcher Yoder, P.C.

(57) ABSTRACT

System and methods are provided. In one embodiment, a system includes a master device comprising a first serial peripheral interface (SPI) port having only a first four wires. The system further includes a slave device comprising a second SPI port having only a second four wires. The system additionally includes a galvanic isolation barrier communicatively coupling the first four wires to the second four wires. The master device is configured to use the first four wires to transmit a plurality of signals representative of a reset and of a first communications mode. The first communications mode is used to transfer data between the master device and the slave device.

21 Claims, 5 Drawing Sheets

SYSTEMS AND METHODS FOR IMPROVED LINKING OF MASTER AND SLAVE DEVICES

BACKGROUND OF THE INVENTION

The subject matter disclosed herein relates to the interfacing or linking of systems, and more specifically, to the linking of master and slave devices.

Certain systems, such as data acquisition systems, may provide for the use of multiple devices. For example, a slave device may be communicatively coupled to a master device, such as a controller, through a linking system. The master device may send certain commands to one or more of the slave devices through the linking system. Responses from the one or more slave devices may then be provided to the master device through the linking system. It would be beneficial to improve the linking system or interface between the master and slave devices.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a master device comprising a first serial peripheral interface (SPI) port having only a first four wires. The system further includes a slave device comprising a second SPI port having only a second four wires. The system additionally includes a galvanic isolation barrier communicatively coupling the first four wires to the second four wires. The master device is configured to use the first four wires to transmit a plurality of signals representative of a reset and of a first communications mode. The first communications mode is used to transfer data between the master device and the slave device.

In a second embodiment, a method includes transmitting a plurality of signals from a first SPI port of a master device through an isolation barrier, wherein the plurality of signals includes a slave select signal (SSEL), a slave clock (SCLK) signal, a master output slave input (MOSI) signal, or a combination thereof. The method additionally includes receiving the plurality signals through a second SPI port of a slave device and determining if the SCLK signal includes a rising edge. The method further includes determining if the SSEL signal is active when the SCLK signal includes the rising edge and determining if a count of SCLK pulses is greater than a number N if the SSEL signal is determined to be active. The method likewise includes transmitting a reset signal if the number of SCLK pulses is determined to be greater than the number N.

In a third embodiment, a system includes a linking system. The linking system includes a communications interface system communicatively coupled to an isolation barrier through a serial peripheral interface (SPI) port and configured to receive a plurality of signals from a master device representative of a reset request, a communications mode request, or a combination thereof. The linking system additionally includes a field input/output (I/O) system communicatively coupled to the communications interface and configured to provide I/O functions. The linking system also includes a reset and mode sensing system communicatively coupled to the communications interface and to the field I/O system and configured to transmit a reset signal to the field I/O system based on the reset request received by the communications interface system.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
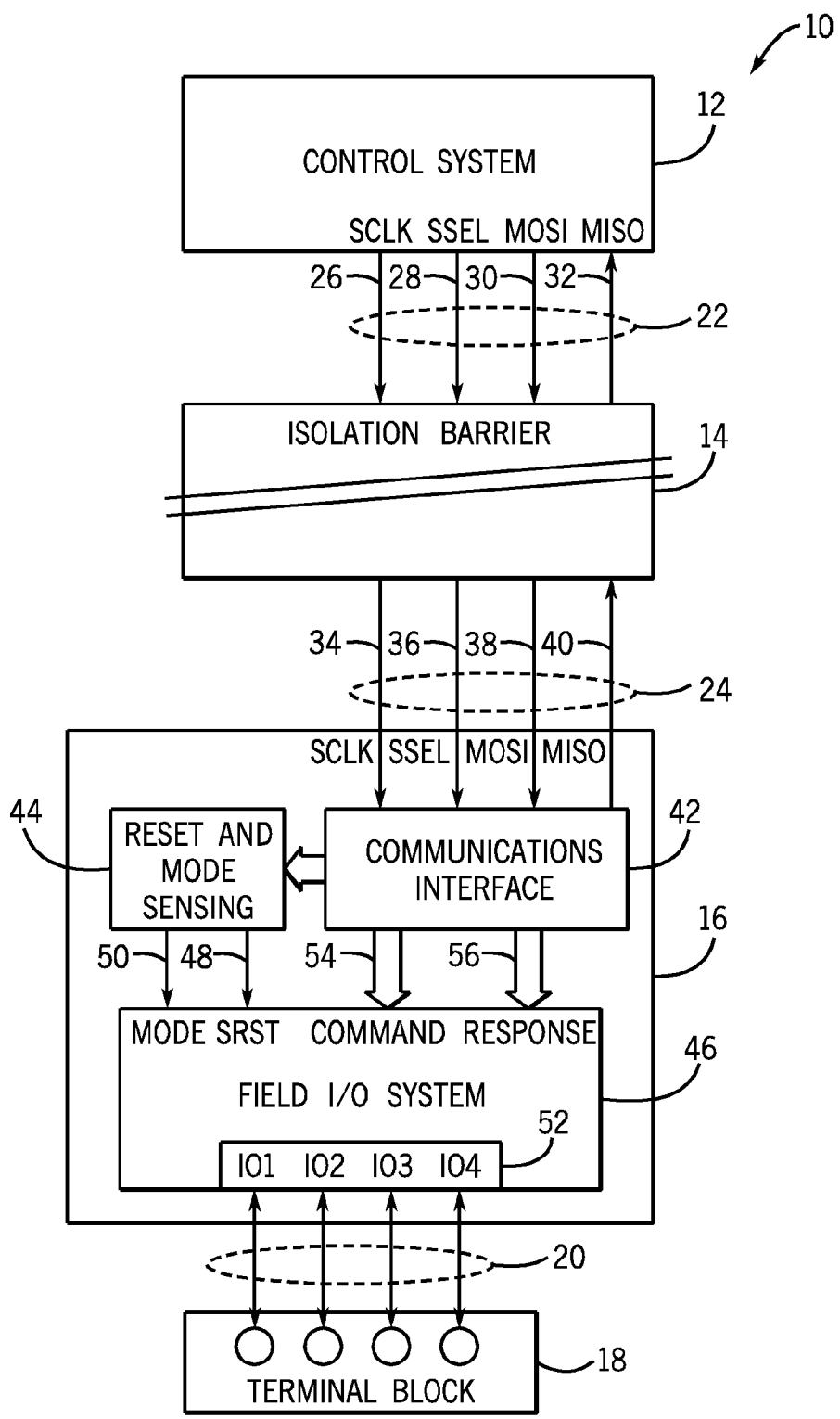
FIG. 1 is a block diagram of an embodiment of a master device communicatively coupled to a linking system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Certain systems, such as controller systems, may include a linking interface communicatively coupling a controller (e.g., master device) to an external system (e.g., slave device), such as a data acquisition system. For example, the controller may delegate data acquisition tasks to the data acquisition system through the linking system, and communicate with the linking system over an isolation bather. The isolation barrier may provide for electrical isolation between the controller and the linking system, thus improving the transmission of signals and enhancing the protection of circuitry. In one embodiment, a serial peripheral interface (SPI) may be used to communicate across the isolation barrier. The SPI may include a "four-wire" serial bus including four pins suitable for communicatively coupling the controller to the linking system. In order to provide, for example, for varying rates of data flows across the SPI wires, additional lines may be used by the linking system additional to a four-wire SPI bus, thus resulting in 5, 6, 7, 8, or more lines. Unfortunately, added lines may increase cost and complexity. The systems and methods described herein do not add any wires additional to the 4 SPI wires, and provide for multiple rates of data flow across the linking system.

In certain embodiments, multiple reset commands may be sent by the master device to the linking system. Each of the multiple reset commands may both preset the external system to a known state and preset the linking system to use a specific command bit width (e.g., 8 to 32 bits or more). Indeed, each command may be sent at differing bit widths, and by selecting desired bit widths, the overhead of the linking system may be minimized and added flexibility may be provided. For example, when using 8 bit commands, the standard SPI protocol may be used, thus communicating with a variety of devices (e.g., microprocessors) that support the SPI protocol through one or more 8 bit data transfers. When using 32 bit commands, multiple of the 8 bit data transfers may be combined into a single data transfer, thus more efficiently transferring data in a reduced time. The data transfers may be supported, for example, by a FPGA or other ASIC included in the linking system.

In one embodiment, the system and methods described herein enable the linking system to recognize a non-standard command, where the data pattern of the non-standard command extends over a number of clocks and may be long enough to cover any other possible standard command with no match. For example, the master output slave input (MOSI) may remain high (or low) for 33 or more clocks for systems that use either multiple byte or single 32 bit commands. When this example of all high or all low MOSI is used, two possible reset situations may then be used to select a desired mode of operation. The systems and methods described herein use the data patterns of all-high or all-low bits, where by contrast, all other commands have at least a few ones or zeros. Accordingly, a counter may be used, suitable for counting the number of successive bits that have the same value (set value or cleared value), thus enabling the derivation of the two command types. The counter may be reset when a slave select line (SSEL) goes inactive or when the bit value changes from all set values to a cleared value or vice versa. Once the counter has exceeded, for example, 33 counts of a clock (e.g., slave clock [SCLK]), a reset sequence may begin. Further, the source of the reset (e.g., all high or all low) may be used to set up the desired mode of operation. In one example, if the source is all low, then the communications port is set for 8 bit SPI. This mode may be used to support existing microcontrollers that are compatible with the standard SPI protocol. Additionally or alternatively, the system may be set to use multiple commands when passing more than 8 bits of data, where each command uses a two byte sequence of a command and an addressing byte followed by data byte. A specific command may be used to force a known response. For example, if the linking system desires a synchronization with the controller, then the controller may use the responses received from the linking system to determine a command versus data byte that is useful for outgoing commands, thus maintaining synchronization.

If the source of the reset is all high, a communication protocol may be set to use a 32 bit interaction suitable for supporting controllers having, for example, FPGA drivers for use in communications. All commands in this all high case may use a single data transfer, thus eliminating the maintenance of synchronization across multiple transfers (e.g., 8 bit transfers) within a command. By providing multiple modes of operations, each mode supporting varying data rates, and by using only 4 SPI lines, the system and methods described herein may provide for enhanced flexibility of communications while minimizing cost and complexity.

With the foregoing in mind and turning now to FIG. 1, the figure depicts a block diagram of an embodiment of an electronic system 10, including a galvanically isolated control system 12 suitable for controlling operations of an industrial plant (e.g., power plant, manufacturing plant, chemical plant, refinery). It is to be noted that, while the depicted embodiment shows the control system 12 in use as a master device, in other embodiments, any master device may be used, including integrated circuit (IC) devices, processors, custom circuits, and so on. The electronic system 10 includes an isolation barrier 14 suitable for isolating communications between the control system 12 and a linking system 16. The isolation bather 14 may be any isolative device suitable for galvanically isolating a section of electrical circuitry, such as a capacitive isolation barrier, an inductive isolation barrier, an optical isolation barrier, or a combination thereof. The linking system 16 may include a complex programmable logic device (CPLD), a field-programmable gate array (FPGA), a programmable array logic (PAL) device, an application specific integrated circuit (ASIC), or a combination thereof. In the depicted embodiment, the linking system 16 is communicatively coupled to a terminal block 18. The terminal block 18 may be used to interface to any number of external systems, including data acquisition systems, actuator systems (e.g., pumps, valves, turbomachinery systems) other control systems, and the like, to the control system 12. Accordingly, commands sent from the control system 12 may be transmitted through the isolation barrier 14 and received by the linking system 16. The linking system 16 may then process the commands as described in more detail below, and transmit data through lines 20 representative of the commands sent by the control system 12. The external systems coupled to the terminal block 18 may respond with data, which may then be processed by the linking system 16, and then passed on to the control system 12 through the isolation barrier 14.

In one example, a SPI bus may be used for communications. Accordingly, the lines 22 may include a slave clock (SCLK) line 26, a slave select (SSEL) line 28, a master output slave input (MOST) line 30, and a master input slave output (MISO) line 32. The lines 26, 28, 30, and 32 may be communicatively coupled through the isolation barrier 14 to corresponding lines 34, 36, 38, and 40. In the depicted embodiment, the lines 34, 36, 38, and 40 are directly coupled to a communications interface system 42 included in the linking system 16. The communications interface system 42 may receive incoming data from the control system 12 and interface with a reset and mode sensing system 44 to communicate with a field input/output (I/O) system 46. More specifically, the communications interface system 42 may recognize certain commands (e.g., reset commands), and use the reset and mode sensing system 44 to reset and/or set a mode of operations for the field I/O system 46. The field I/O system 46 may provide a variety of field I/O functions, such as analog I/O functions, digital I/O functions, voltage sensing functions, current sensing functions, voltage regulation functions, current regulation functions, de-bounce functions, temperature sensing functions, and the like, useful in interfacing with external systems, such as data acquisition systems, actuation systems (e.g., pumps, valves, switch actuators) and/or other control systems 12. The communications interface system 42, the reset and mode sensing system 44, and/or the field I/O system 46 may include a CPLD, a FPGA, a PAL, an ASIC, or a combination thereof.

In one example, the counter may be used by the linking system 16, suitable for counting the number of successive bits incoming through the MOSI line 38 that have the same value (set value or cleared value), thus enabling the derivation of at least two command types. The counter may be reset, for example, when the slave select line (SSEL) 36 goes inactive or when the bit value changes from all set values to a cleared value, or vice versa. Once the counter has exceeded, for example, 33 counts of a clock (e.g., using the SCLK line 34), a reset sequence may begin within the Field I/O system 46 by using the reset line 48. Further, the source of the reset (e.g., all high or all low) may be used to set up the desired mode of operation through mode line 50. In one example, if the source is set all low, then a communications port 52 may be set for 8 bit SPI data. This 8-bit mode may be used to support existing microcontrollers that are compatible with the standard SPI protocol. Accordingly, rather than the control system 12 providing two more signals directed at lines 48 and 50, the techniques described herein may use only four signals communicated through lines 34, 36, 38, and 40.

Additionally or alternatively, the linking system 16 may be set to use multiple commands when passing more than 8 bits of data, where each command uses a two byte sequence including a command and an addressing byte combination followed by data byte. A specific command may be used to force a known response. For example, if the linking system 16 desires synchronization with the control system 12, then the control system 12 may use the responses received from the linking system 16 to determine a command versus data byte that is useful for outgoing commands, thus maintaining synchronization.

If the source of the reset is all high, communication may be set to use a 32 bit interaction via the field I/O system 46. All commands in this all high case may use a single 32 bit data transfer, thus eliminating the maintenance of synchronization across multiple transfers (e.g., 8 bit transfers) within a command. By providing multiple modes of operations, each mode supporting varying data rates, and by using only 4 SPI lines, the system and methods described herein may provide for enhanced flexibility of communications while minimizing cost and complexity. Accordingly, by using only four lines, e.g. four-wire SPI lines 22 and 24, the embodiments described herein enable the use of varying rates of command 54 and response 56 data flows. For example, command lengths, such as 8 bit, 16 bit, 32 bit, 64 bit commands or more, may be transmitted through lines 22 through the isolation bather 14 and into the lines 24. The linking system 16 may process the command by using the techniques described herein, and interface with systems coupled to the terminal board 18 based on the command. By using only four-wires to support multiple data flow rates, the techniques described herein may enable a minimization of component count for the system 10, improve flexibility, and decrease costs.

Figure 2:
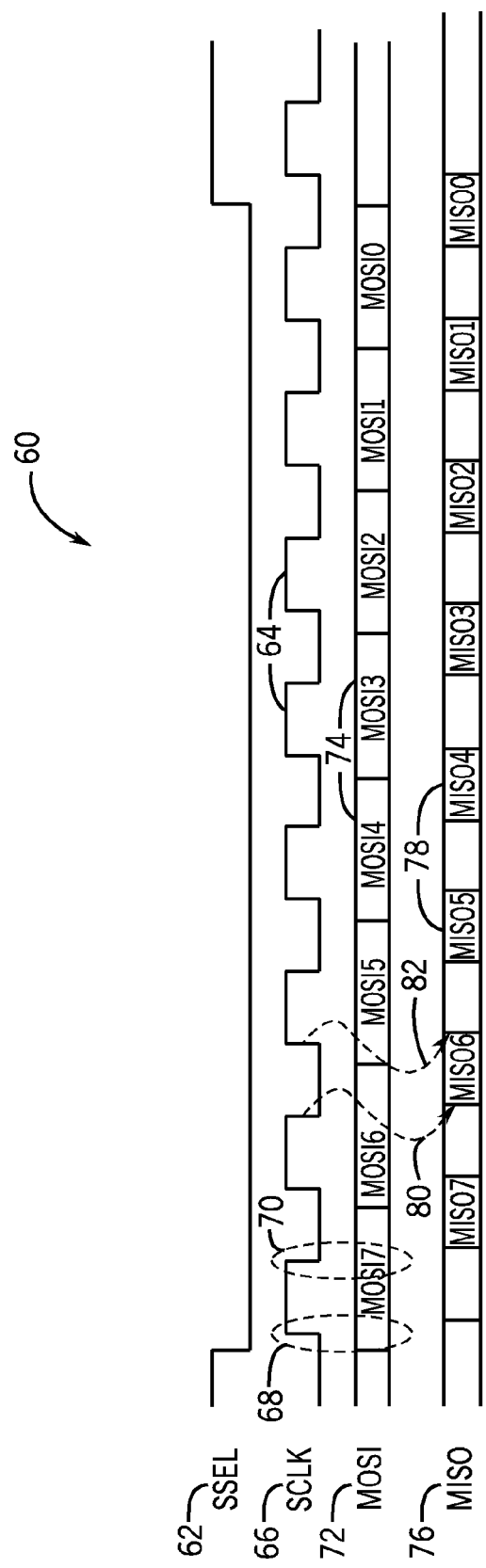
FIG. 2 is a timing diagram of an embodiment of signals transmitted by the master device of FIG. 1.

FIG. 2 illustrates an embodiment of timing diagram 60 enabling SPI full duplex communications, including communications at various data flow rates. Indeed, the techniques described herein enable the use, for example, of full duplex SPI data transfers. In the depicted embodiment, the master device (e.g., control system 12 of FIG. 1) may transmit an active low SSEL signal 62, for example, by using the SSEL line 28. In other embodiments, an active high SSEL signal may be used. The SSEL signal 62 may be kept active low during the duration of the communication, such as over eight clock pulses 64 (e.g., one byte) as cycled by using a SCLK signal 66 transmitted through the SCLK line 26. Accordingly, a byte may be communicated when the SSEL signal 62 is used. Longer pulses may also be used, suitable for transferring multiple bytes (e.g., 2, 3, 4, 5, or more bytes). Indeed, N pulses may be used, where N is a number greater than the length of a standard SPI command.

Leading edges 68 or trailing edges 70 of the SCLK signal 66 may be used to transfer commands 54 and responses 56. For example, a MOSI signal 72 may be issued by the control system 12 prior to a rising edge 68 or a falling edge 70 of the SCLK signal 66 through the MOSI line 30. In the depicted embodiment, eight MOSI transmissions 74 issued by the control system 12 are shown, labeled MOSI0-MOSI7. In response to the MOSI transmissions 74, the linking system 16 may issue response signals MISO 76, resulting in a series of one or more MISO transmissions 78, each MISO transmission 78 corresponding to each MOSI transmission 74. The transmissions 78 may be transmitted through MISO line 32 based on rising edges 68 or falling edges 70 of the SCLK signal 66, as shown by arrows 80 (e.g., falling edge arrow) and 82 (e.g., rising edge arrow). In the depicted embodiment, eight transmissions 78 labeled MISO0-MISO7 are shown. It is to be understood that any number of bit transmissions may be used, additional to or alternative to the depicted 8 bit transfer, including 16 bit transfers, 32 bit transfers, 64 bit transfers, or more. By enabling SPI data transfers, the techniques described herein may be used in a variety of devices that support SPI interfaces, including microprocessors, data acquisition ICs, custom ICs, and the like.

Figure 3:
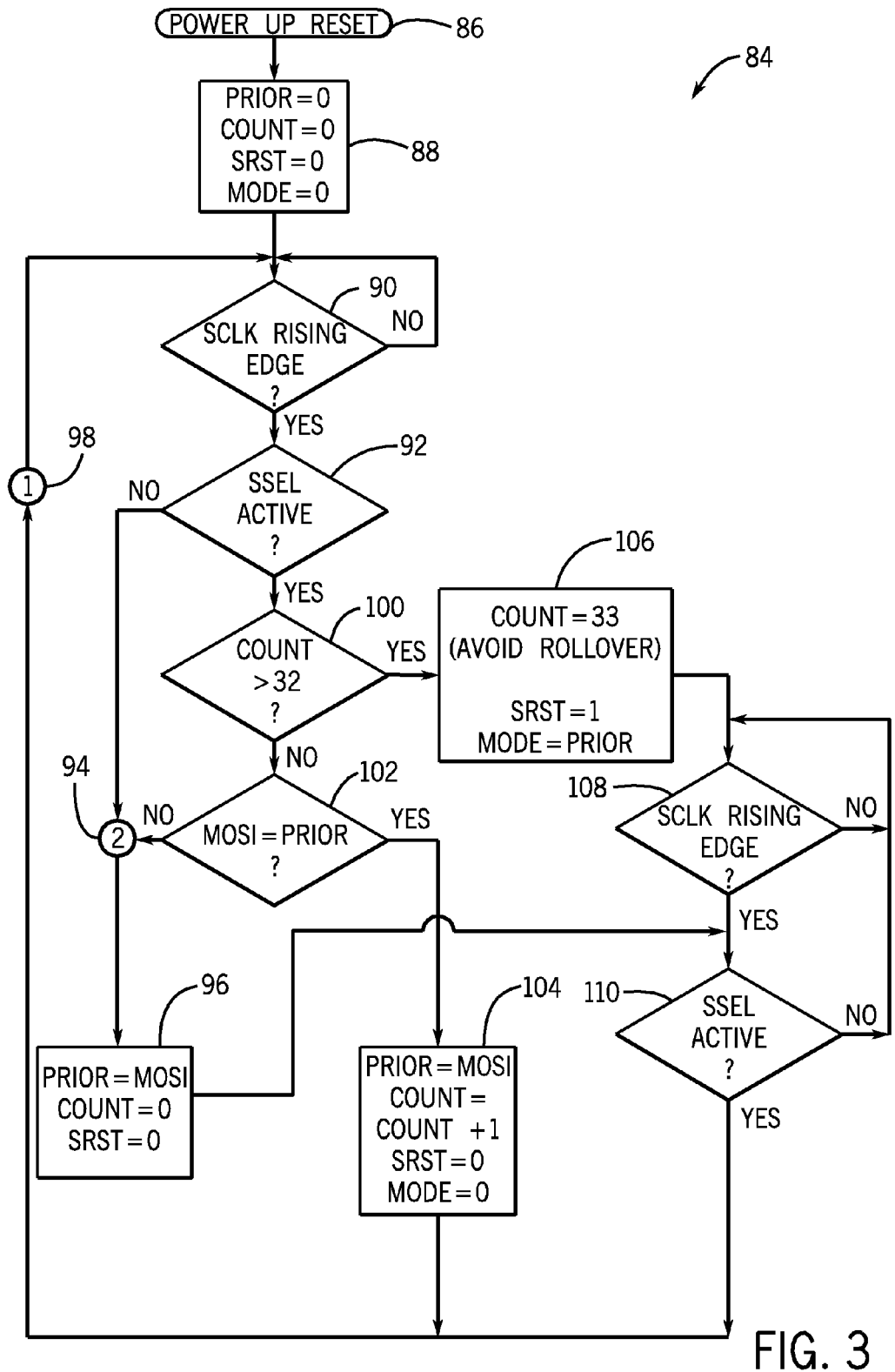
FIG. 3 is a flow chart of an embodiment of a process for decoding and acting upon certain of the signals of FIG. 2.

FIG. 3 is a flowchart illustrating an embodiment of a process 84 suitable for enabling multiple modes of operations for the system 10 shown in FIG. 1. The process 84 may be stored as code or computer instructions, for example, in non-transitory tangible computer-readable medium, such as a memory of the linking system 16. The process 84 may interpret, for example, the SSEL signal 62, the SCLK signal 66, and the MOSI signal 72 shown in FIG. 2 being transmitted by the control system 12. Certain timings and patterns may be derived by the process 84, and multiple operating modes having different bit interactions (e.g., 8 bit interaction, 32 bit interaction) may be operationally executed by the linking system 16 based on the timings and patterns. Accordingly, only 4 SPI galvanically isolated lines may be used, thus minimizing the number of components of the system 10, reducing cost, and increasing flexibility.

The process 84 may reset (block 86), for example, the linking system 16, when power is turned on. The process 84 may then set (block 88) two variables (e.g., registers) PRIOR to zero and COUNT to zero, and set the SRST line 48 to zero, and MODE line 50 also to zero. Accordingly, the field I/O system 46 may be reset and ready to begin communications, including communications having differently-sized commands. For example, at least two communication modes may be supported. A first mode may use, for example, 8 bit data transfers, and a second mode may use, for example, 32 bit data transfers. The 8-bit data transfers may be useful in ICs that support the standard SPI protocol, while the 32-bit transfers may be useful in moving more data. The process may then determine (decision 90) if the SCLK signal 66 is on a rising edge (for rising edge embodiments), such as the rising edge 68 shown in FIG. 2. If the SCLK signal 66 is not on a rising edge (decision 90), then the process 84 may iterate back to decision 90 until a rising edge is found. If the SCLK signal 66 is on a rising edge (decision 90), then the process 84 may determine (decision 92) if the SSEL signal 62 is active (e.g., active low or active high).

If the SSEL signal 62 is not active (decision 92), the process may go through process point 94 (e.g., labeled "2" and described in further detail below) and then set the PRIOR variable to the value of the MOSI signal 72, the COUNT variable to zero, and set the SRST line 48 to zero of the field I/O system 46. The process 84 may then go to decision 110 and wait for the SSEL signal 62 to go inactive. This detects a normal transfer where the data in the MOSI signal 72 is not all high or all low, indicating a transfer of control information from the control system 12 to the field I/O system 46. Setting the PRIOR variable to the value of the MOSI signal 72 may be used by the control system 12 in switching operation modes between the first mode and the second mode based on the value transmitted by the control system 12.

The process 84 may go through process point 98 (e.g., labeled "1" and described in further detail below) and then iterate back to decision 90. If the process 84 determines (decision 92) that the SSEL signal 62 is active, then the process 84 may determine (decision 100) if the COUNT is greater than 32. While in the depicted embodiment the decision 100 may be using the number 32 useful in 32 bit transmissions, other numbers may be used for other bit rates, e.g., 16 bit, 64 bit, 128 bit, and so on. Indeed, the COUNT may be determined to be greater than the number N where N is greater than the standard length of an SPI command. If the process 84 determines (decision 100) that the COUNT does not exceed 32 (or any number N), then the process 84 may determine (decision 102) if MOSI is equal to the PRIOR value. If MOSI is not equal to the PRIOR value (decision 102), then the process 84 may go to block 96 and proceed as described above.

If MOSI is equal to the PRIOR value (decision 102), then the process 84 may set (block 104) PRIOR equal to MOSI, add one to the COUNT, set the SRST line 48 to zero, and set the MODE line 50 to zero. By continuously adding to the COUNT (block 104) when MOSI is equal to PRIOR (decision 102), the control system 12 may continuously increment the COUNT beyond a desired limit (e.g., 32) to switch between the first mode (e.g., 8 bit mode) the second mode (e.g., 32 bit mode) of communications. Accordingly, the process 84 may then proceed through process point 98 and iterate back to decision 90.

If the process 84 determines (decision 100) that the COUNT exceeds 32, the process 84 may set (block 106) the COUNT to 33, for example, to avoid rollover, set the SRST line 48 to one and set the MODE line 50 to PRIOR. By setting MODE to PRIOR (block 106), the control system 12 may transition the field I/O system 46 to the second mode of communications (e.g., 32 bit communications).

The process 84 may then determine (decision 108) if the SCLK signal 66 is on a rising edge (for rising edge embodiments). If the SCLK signal 66 is not on a rising edge (decision 108), the process 84 may iterate until the SCLK signal 66 is on a rising edge. Once the SCLK signal 66 is on a rising edge (decision 108), the process 84 may then determine (decision 110) if the SSEL signal 62 is active. If the SSEL signal 62 is not active (decision 110), then the process 84 may iterate back to decision 108. If the SSEL signal 62 is active (decision 110), then the process 84 may iterate through process point 98 and back to decision 90. In this manner, the process 84 may read the three signals SSEL 62, SCLK 66, and MOSI 72, and derive reset and mode logic for the field I/O system 16. Such operations may then include multiple data transfer modes, such as 8 bit, 16 bit, 32 bit, 64 bit, or more.

As an option, the process 84 may enable a reset if there are five or more bytes sent each having 0x00 (all lows) or 0xFF (all highs). Further, when determining if the SSEL signal 62 is active (decision 92), rather than going to process point 94 if the SSEL signal 62 is not active, the process 84 may, in other embodiments, go to process point 98 instead. By jumping to process point 98, the process 94 may save time and not clear the parameters at block 96. It is to be further noted that, for certain devices that do not include the ability to send out long bursts (e.g., bursts suitable for following "No" branch of decision 92), "bit banging" may be used to enable long bursts. That is, software may be used rather than dedicated hardware to provide the long bursts.

Figure 4:
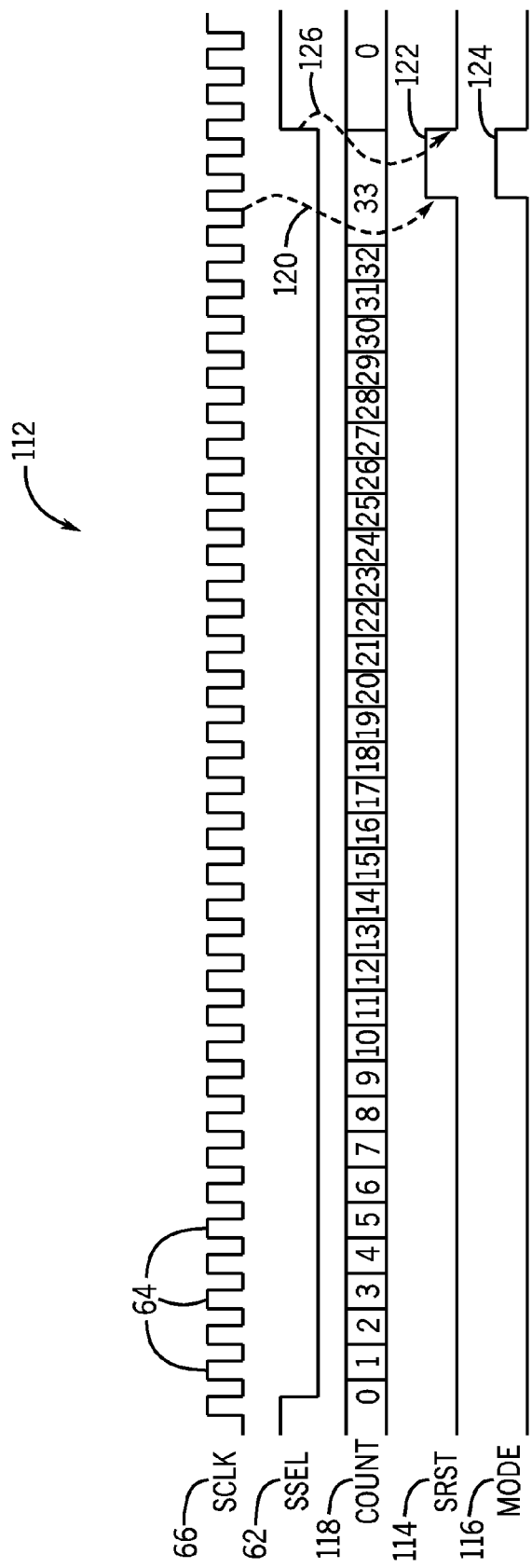
FIG. 4 is a timing diagram of an embodiment signals suitable for reset and mode execution.

FIG. 4 illustrates an embodiment of a timing diagram 112 depicting the use of the SCLK signal 66 having the multiple pulses 64 suitable for triggering a SRST signal 114. The timing diagram also depicts the use of a MODE signal 116 useful in setting up multiple modes of communications, such as modes having different data rates (e.g., 8 bit, 16, bit, 32, bit, 64 bit data rates). As mentioned above, a counter 118 may be used to keep track of successive pulses 64. Once the pulses 64 exceed a desired number, such as 32, the SRST signal 114 may be transmitted through the SRST line 48, as indicated by arrow 120 and pulse 122. Likewise, the MODE signal 116 may be transmitted, for example, if the MOSI signal 72 is set and the counter 118 exceeds 32, as indicated by pulse 124. When the MODE signal 116 is set to one, as depicted in pulse 124, the field I/O 16 may be set to use, for example, 32 bit communications. Accordingly, communications after arrow 126 may be in 32 bits. When the MODE signal 116 is set to zero, for example, before arrow 124, communications may be in 8 bits. By enabling multiple communications modes through the isolated four-wires 34, 36, 38, and 40, the techniques described herein may limit the number of isolation barriers 14 used, thus minimizing component count for the system 10, reducing costs, and increasing flexibility.

Figure 5:
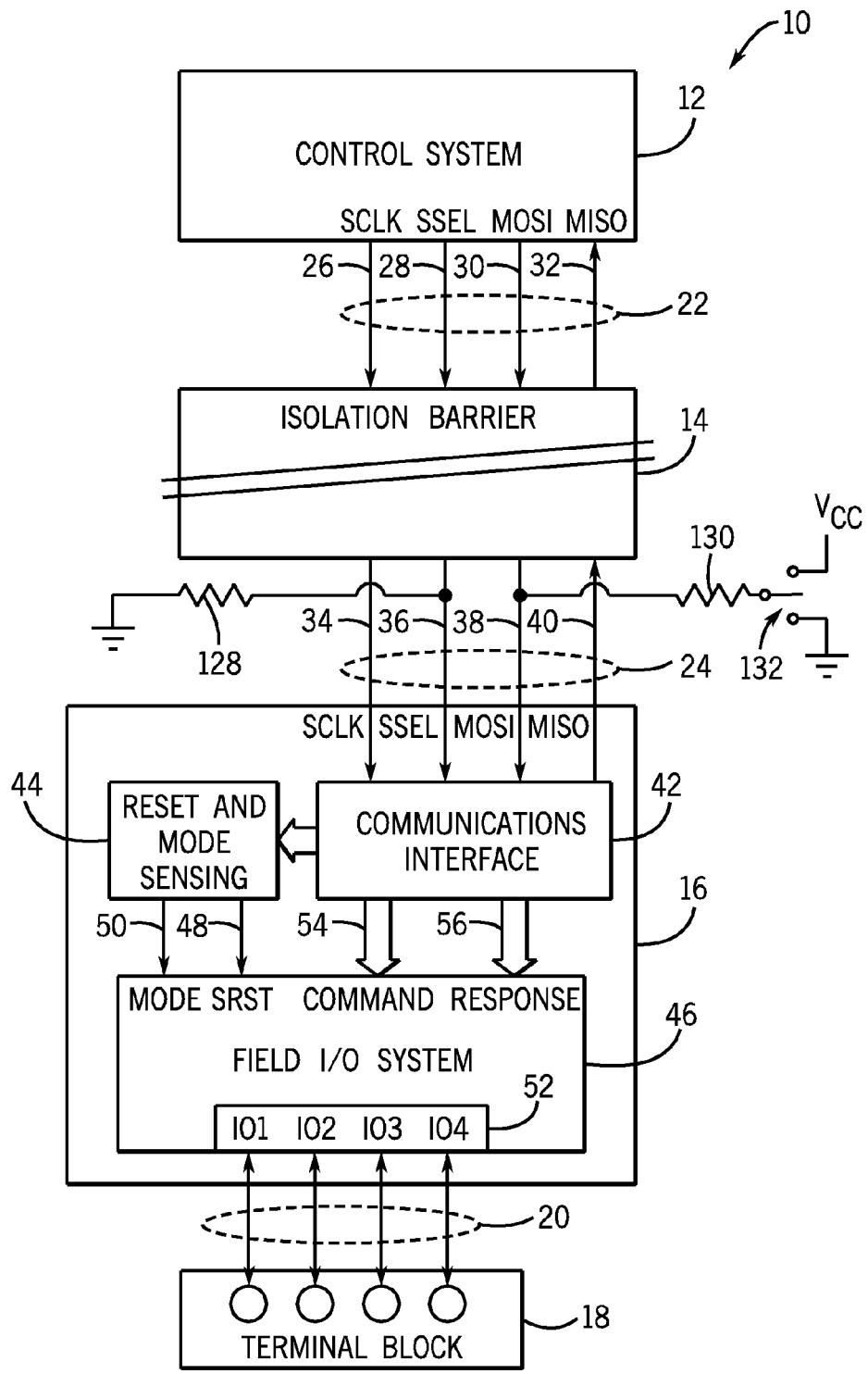
FIG. 5 is a block diagram of an embodiment of the master device communicatively coupled to the linking system of FIG. 1 with additional reset and mode hardware.

The reset techniques may also function during power up, for example, with the isolation barrier 14 providing either tri-state operations (e.g., high impedance) and/or a default output state until the isolation barrier's internal circuitry completes setup operations to provide the desired signal to the other side (e.g., linking system 16 side). Accordingly, FIG. 5 illustrates an embodiment of the electronic system 10 including a SSEL pulldown resistor 128, and additionally, a MOSI resistor 130 and switch 132. Because the figure includes like elements to FIG. 1, the like elements are depicted with like numbers.

By having the SSEL and MOSI lines 36 and 38 remain, for example, in tri-state (e.g., high impedance) while the SCLK signal 66 begins to operate, for example, for at least 34 clocks, pull up or pull down resistors 128, 130 on the isolated signal path may be used to choose the hardware setting for the data communication width (e.g., 8 bit, 16 bit, 32 bit, 64 bit, 128 bit, and so on). The power up operation may pull SSEL line 36 low with MOSI line 38 set or cleared as desired via switch 132 for 33 (or other desired bit numbers). This technique may be used where multiple isolation devices are available, since the tri-state often operates across all drivers on one side of the barrier 14 (since tri-stating SCLK 34 while attempting to tri-state SSEL 36 and MOSI 38 may prevent proper reset operation). When these techniques are used with multiple devices downstream of the barrier 14, such as devices in a daisy chain or in parallel connections downstream of the barrier 14, the number of clocks may be adjusted to greater than N*32 where N is the number of downstream devices.

Technical effects of the invention include enabling galvanically isolated communications at varying data flow rates between a master device (e.g., control system), and a slave device (e.g., linking system). The master and the slave devices may each use a single "four wire" SPI ports. Custom communications as well as standard SPI communications are enabled through the linking device. Custom data patterns may be observed, such as data patterns having all highs or all lows, leading to the execution of logic related to the custom patterns, including logic to reset and to enable different data flow communication rates. Further technical effects include the minimization of component counts.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system comprising:
   a master device comprising a first serial peripheral interface (SPI) port having only a first four wires;
   a slave device comprising a second SPI port having only a second four wires; and
   a galvanic isolation barrier communicatively coupling the first four wires to the second four wires, wherein the master device is configured to use the first four wires to transmit a plurality of signals representative of a reset and of a first communications mode, and wherein the first communications mode is used to transfer data between the master device and the slave device, wherein the slave device comprises a linking system communicatively coupled to a terminal block and configured to operate as an input/output (I/O) interface between the master device and an external system communicatively coupled to the terminal block.

2. The system of claim 1, wherein the linking system comprises a field I/O system having a communications port coupled to the terminal block and configured to provide field I/O functions used to interface with the external system.

3. The system of claim 2, wherein the linking system comprises a communications interface system configured to receive the plurality of signals representative of the reset and of the first communications mode and translate the plurality of signals into a reset signal used to reset the field I/O system and a mode signal used configure the field I/O system to use the first communications mode.

4. The system of claim 3, wherein linking system comprises a remote and mode sensing system communicatively coupled to the communications interface system and configured to transmit the reset signal and the mode signal into the field I/O system.

5. The system of claim 1, wherein the plurality of signals comprise a slave select (SSEL) signal, a slave clock (SCLK) signal, a master output slave input signal (MOSI), a master input slave output signal (MISO) or combination thereof.

6. The system of claim 5, wherein the SCLK signal comprises at least N number of pulses and wherein the second SPI port comprises a communication protocol configured to support a plurality of standards SPI commands, and all of the standard SPI commands having a bit length of less than N.

7. The system of claim 6, wherein the master device is configured to set the SSEL signal to all high or to all low during the at least N number of pulses, and wherein the slave device is configured to execute the reset based on the SSEL signal being all high or all low during the at least N number of pulses.

8. The system of claim 6, wherein the master device is configured to set the SSEL signal to all high or to all low during the at least N number of pulses, and wherein the slave device is configured to change to a second communications mode based on the SSEL signal being all high or all low during the at least N number of pulses.

9. The system of claim 8, wherein the first communications mode comprises an 8 bit communications mode and wherein the second communications mode comprises a 32 bit communications mode.

10. The system of claim 1, comprising an industrial plant, and wherein the master device comprises a control system configured to control operations of the industrial plant.

11. A method comprising:
    transmitting a plurality of signals from a first SPI port of a master device through an isolation barrier, wherein the plurality of signals includes a slave select signal (SSEL), a slave clock (SCLK) signal, a master output slave input (MOSI) signal, or a combination thereof;
    receiving the plurality signals through a second SPI port of a slave device;
    determining if the SCLK signal includes a rising edge;
    determining if the SSEL signal is active when the SCLK signal includes the rising edge;
    determining if a count of SCLK pulses is greater than a number N if the SSEL signal is determined to be active; and
    transmitting a reset signal if the number of SCLK pulses is determined to be greater than the number N.

12. The method of claim 11, comprising transmitting a mode signal if the number of SCLK pulses is determined to be greater than the number N.

13. The method of claim 12, comprising moving from a first mode of operations to a second mode of operations when the mode signal is transmitted.

14. The method of claim 13, wherein the first mode of operations comprises an 8 bit mode of operations and the second mode of operations comprises a 32 bit mode of operations.

15. The method of claim 14, comprising determining if the MOSI signal is equal to a PRIOR value and adding to a counter if the count is less than the number N and if the MOSI signal is equal to the PRIOR value.

16. A system comprising:
    a linking system comprising:
      a communications interface system communicatively coupled to an isolation barrier through a serial peripheral interface (SPI) port and configured to receive a plurality of signals from a master device representative of a reset request, a communications mode request, or a combination thereof;
      a field input/output (I/O) system communicatively coupled to the communications interface system and configured to provide I/O functions; and
      a reset and mode sensing system communicatively coupled to the communications interface system and to the field I/O system and configured to transmit a reset signal to the field I/O system based on the reset request received by the communications interface system, wherein the reset and mode sensing system is configured to transmit a first mode signal to the field I/O system based on a first mode request received by the communications interface system through a combination of the SCLK wire, SSEL wire, and MOSI wire, wherein the linking system is configured to operate in a first communications mode based on the first mode request.

17. The system of claim 16, wherein the SPI port comprises only a slave clock (SCLK) wire, a slave select (SSEL) wire, a master output slave input (MOST) wire, and a master input slave output (MISO) wire.

18. The system of claim 16, wherein the reset and mode sensing system is configured to transmit a second mode signal to the field I/O system based on a second mode request received by the communications interface system through a combination of the SCLK wire, SSEL wire, and MOSI wire, and the linking system is configured to operate in a second communications mode based on the second mode request.

19. A system comprising:
a master device comprising a first serial peripheral interface (SPI) port having only a first four wires;
a slave device comprising a second SPI port having only a second four wires; and
a galvanic isolation barrier communicatively coupling the first four wires to the second four wires, wherein the master device is configured to use the first four wires to transmit a plurality of signals representative of a reset and of a first communications mode, and wherein the first communications mode is used to transfer data between the master device and the slave device, wherein the plurality of signals comprise a slave select (SSEL) signal, a slave clock (SCLK) signal, a master output slave input signal (MOST), a master input slave output signal (MISO) or combination thereof, wherein the SCLK signal comprises at least N number of pulses and wherein the second SPI port comprises a communication protocol configured to support a plurality of standards SPI commands, and all of the standard SPI commands having a bit length of less than N.

20. The system of claim 19, wherein the master device is configured to set the SSEL signal to all high or to all low during the at least N number of pulses, and wherein the slave device is configured to execute the reset based on the SSEL signal being all high or all low during the at least N number of pulses.

21. The system of claim 19, wherein the master device is configured to set the SSEL signal to all high or to all low during the at least N number of pulses, and wherein the slave device is configured to change to a second communications mode based on the SSEL signal being all high or all low during the at least N number of pulses.

* * * * *